United States Patent [19]

Farah et al.

[11] Patent Number: 5,055,656

[45] Date of Patent: Oct. 8, 1991

[54] BATTERY HEATING SYSTEM USING INSTANTANEOUS EXCESS CAPACITY OF A VEHICLE ELECTRICAL POWER GENERATING SUBSYSTEM

[75] Inventors: Andrew J. Farah, Bayside; William J. Wruck, Shorewood, both of Wis.

[73] Assignee: Globe-Union, Inc., Milwaukee, Wis.

[21] Appl. No.: 454,076

[22] Filed: Dec. 21, 1989

[51] Int. Cl.$^5$ ............................................. H05B 1/02
[52] U.S. Cl. ..................................................... 219/209
[58] Field of Search ...................... 219/201, 209; 320/2, 320/5, 22, 35, 31; 429/100, 112, 52; 322/7, 8, 33, 34

[56] References Cited

U.S. PATENT DOCUMENTS

| | | | |
|---|---|---|---|
| 2,386,903 | 10/1945 | Lutomirski | 219/209 |
| 2,440,369 | 4/1948 | Furman | 123/142 S E |
| 2,516,048 | 7/1950 | Endress | 219/209 |
| 2,679,549 | 5/1954 | Rezek et al. | 219/202 |
| 3,076,127 | 1/1963 | Grecu | 219/209 |
| 3,156,813 | 11/1964 | Trainor | 219/526 |
| 3,469,072 | 9/1969 | Carlson | 219/209 |
| 3,594,547 | 7/1971 | Quinn | 219/529 |
| 3,623,916 | 11/1971 | Toyooka et al. | 429/120 |
| 3,723,187 | 3/1973 | Toydoka et al. | 429/120 |
| 4,025,861 | 5/1977 | Godard et al. | 320/23 |
| 4,081,737 | 3/1978 | Miyahara | 219/209 |
| 4,222,000 | 9/1980 | Silvertown et al. | 320/35 |
| 4,229,687 | 10/1980 | Newman | 320/2 |
| 4,524,264 | 6/1985 | Takeuchi et al. | 219/209 |
| 4,591,692 | 5/1986 | Wightman | 219/209 |
| 4,600,665 | 7/1986 | Sanders | 429/120 |
| 4,629,967 | 12/1986 | Voss | 322/28 |
| 4,650,729 | 3/1987 | Nakamura et al. | 429/61 |
| 4,659,977 | 4/1987 | Kissel et al. | 320/64 |
| 4,667,140 | 5/1987 | Sweetman | 318/696 |
| 4,686,446 | 8/1987 | Nishimura et al. | 322/33 |

OTHER PUBLICATIONS

Proceedings of the 30th Power Sources of Symposium (1983).

*Primary Examiner*—Teresa J. Walberg
*Assistant Examiner*—Tuan Vinh To
*Attorney, Agent, or Firm*—Foley & Lardner

[57] ABSTRACT

A charge management system and method, within a vehicle having a battery and generation subsystem, is disclosed which senses the temperature of electrolyte in the cells of the vehicle battery and the voltage across the terminals of the battery. The voltage indicates the probability of the existence of excess electrical capacity from the vehicle generation subsystem. In response to a cold temperature and excess power, the system uses the excess power of the vehicle generation subsystem to heat the battery to a desired level. Once the battery reaches the desired temperature level, the system dicontinues the heating of the battery. In the event that there is not excess power, then the system, by maintaining the battery heating element in an off position, does not interfere with the charging of the battery.

41 Claims, 3 Drawing Sheets

BATTERY HEATING SYSTEM USING INSTANTANEOUS EXCESS CAPACITY OF A VEHICLE ELECTRICAL POWER GENERATING SUBSYSTEM

BACKGROUND OF THE INVENTION

1. Field of the Invention

The present invention relates to a method and device for controlling the heating of a battery and more particularly to a method and device for controlling the selective heating of an automobile battery using the excess electrical capacity of the vehicle electrical power generation subsystem comprising an alternator, rectifier and regulator.

2. Description of the Prior Art

By way of background, it is appropriate to initially provide a brief description of the modern vehicle electrical system. It is helpful to consider such systems as being divided into three major parts: the electrical power generation subsystem, the storage battery and the electrical loads. The generation subsystem usually consists of a poly-phase alternator, a rectifier and a voltage regulator.

The actual electrical power for the electrical loads may come from two sources: the storage battery and/or the generation subsystem. When the engine of the vehicle is not running the battery supplies the necessary power. When the engine is running, i.e. the alternator is turning, the generation subsystem supplies the power, including that which is necessary to recharge the battery. These two sources are electrically connected in parallel such that they interact to determine the voltage level of the system that is available to the loads.

Both the battery and the generation subsystem have limits to the amount of power they can supply. The battery supplies only so much power for so long before its energy reserve is depleted and its voltage drops to a point below what is useful. The generation subsystem can supply power for as long as the alternator is turning. The amount of available power is related to the alternator RPM, the temperature of the generation components and the voltage at which the power is supplied.

When the engine is not running, the battery supplies power at a voltage that is a function of the battery's state of charge and the rate at which the battery is supplying current. On the other hand, when the engine is running, the generation subsystem supplies the power at a voltage that is determined by the regulator. This voltage value, or set point voltage, is such that the generation subsystem will act to charge the battery. However, if the generation subsystem cannot meet the electrical load's demand at the set point voltage plus the additional demand required to charge the battery, the system voltage will drop to a value less than the set point voltage. This is often referred to as unregulated operation.

In the case where the generation subsystem's capacity is exceeded, the battery in combination with the alternator/rectifier and the presently powered electrical loads reach a point of balance that determines the system voltage available to the loads. This balance is the result of the general current/voltage relationship of the electrical components.

For the battery, as the system voltage drops below the set point voltage the charge current into the battery also drops. If the voltage continues to fall below the point where the battery will charge, the battery begins to discharge to make up for the lack of available power in the generation subsystem. For the unregulated alternator/rectifier, as the system voltage drops the amount of current that it can provide will increase. These two trends alone will act to cause the unregulated voltage to settle to a value below the set point called the balance voltage. Generally, loads require less current at lower voltages, which aids in the balancing.

A regulator controls the voltage available to the loads when the generation system has sufficient capacity to meet the electrical power demand. In modern electrical system, this is commonly accomplished by a closed-loop control system that varies the average electrical current thru the alternator's field coil which in turn varies the rotor's magnetic field and hence the alternator's output current. The voltage at the loads is a function of the alternator output current across the loads of the vehicle. The regulator monitors this voltage and varies the field coil current to control the voltage to the set point.

As the characteristics that control generation subsystem capacity and vehicle electrical load vary, the primary function of the regulator is to respond in such a manner as to present suitable voltage to the loads and battery. This means being able to quickly reduce the field current when the electrical demand is reduced, thereby preventing the overvoltage of the loads, and being able to increase the field current in a controlled fashion when the demand is increased.

The regulator set point is chosen such that the voltage is high enough that it will charge the battery directly from the rectified alternator output. In this way, the battery acts as another load on the vehicle. The set point voltage must also be low enough so that the rest of the vehicle loads will not exceed their rated maximum operation voltage.

It has long been observed that batteries charge less effectively and have reduced available power at lower temperatures. That is, the charge acceptance and discharge performance at such temperatures are said to be reduced. Consequently, many techniques have been employed by vehicle operators, automobile manufacturers and battery manufacturers to ensure that the temperature of the batteries are at desired levels upon starting and during operation when the underhood temperature is not sufficient to warm the battery. Various charge management systems that are based on heating have been employed having heating elements both within and without the internal confines of batteries. U.S. Pat. No. 3,723,187 issued on May 27, 1973 to Toydoka is an example of an internal system while U.S. Pat. No. 4,081,737 issued Mar. 28, 1978 to Mijahara is an example of an external system.

One problem with such heating systems is the need to employ a power source to heat the battery. The power source may be on or off-board the vehicle in which the battery is located. When heating is to be accomplished for vehicle batteries in a moving vehicle, it is clear that the source supplying the energy necessary to heat the battery must be on board the vehicle. U.S. Pat. No. 4,025,861 issued May 24, 1977 to Godard describes a device for heating a battery only when the voltage of the battery reaches a certain predetermined value which depends upon the battery's state of charge and on battery temperature. U.S. Pat. No. 4,222,000 issued Sept. 9, 1980, describes a battery system in which the alternator driven by the vehicle engine supplies an alternating current directly to the battery, the internal resistance thereof causing heat to be dissipated which raises the temperature of the electrolyte.

Alternatively, some vehicle manufacturers have employed a charge management strategy which involves raising the regulator's set point voltage when the underhood temperature is low to compensate for the reduced charge acceptance of the battery. As the charging voltage is raised for a constant battery temperature, the rate of charge acceptance increases. Temperature sensors for such strategies have been located in the alternator/regulator package, in a remote regulator module and in direct contact with the battery.

A major deficiency of this charge management strategy is that when the battery is very cold, the voltage may not be able to be raised high enough to properly charge the battery without damaging other electrical components. Furthermore, when the temperature sensor is located in the alternator/regular package or in a remote regulator module, the sensor heats much more rapidly than the battery does and to a level that is not necessarily the same as the battery. Thus, there is a reduction in the set point voltage; however, higher voltage is still needed to compensate for the low charge acceptance capability of the battery. Also, this strategy does nothing to directly increase battery temperatures which would result in improved charge acceptance and discharge performance.

SUMMARY OF THE INVENTION

A desirable charge management strategy should result in a greater average battery state of charge through increased charge acceptance and improved discharge performance resulting from increasing the temperature of the battery. For the strategy to be of most convenience to the vehicle operator, the energy to accomplish this should be generated on board the vehicle, without sacrifice of the energy required to charge the battery itself. According to the present invention, the desired results are accomplished by a charge management system and method within a vehicle having a generation subsystem, a battery and an electric heating element positioned near the battery. The system senses the voltage across the terminals of the battery which indicates the probability of the existence of excess electrical capacity from the generation subsystem, and senses the temperature of the battery. In response to a low battery temperature and excess capacity, the system uses the excess capacity of the generation subsystem to heat the battery to a desired level. Once the battery reaches the desired temperature level, the system discontinues the heating of the battery. In the event that there is not excess capacity, then the system, by maintaining the battery heating element in an off state, does not interfere with the charging of the battery.

Alternatively, the energy to accomplish this strategy may be supplied by an off-board source such as a battery charger. When connected across the terminals of a battery in a vehicle having an engine that is not running, the charger, like the generation subsystem, may have more capacity than is necessary to charge the battery at the voltage it selects. If so, the charge management system will act as before and heat the battery.

BRIEF DESCRIPTION OF THE PREFERRED EMBODIMENT

Figure 1:
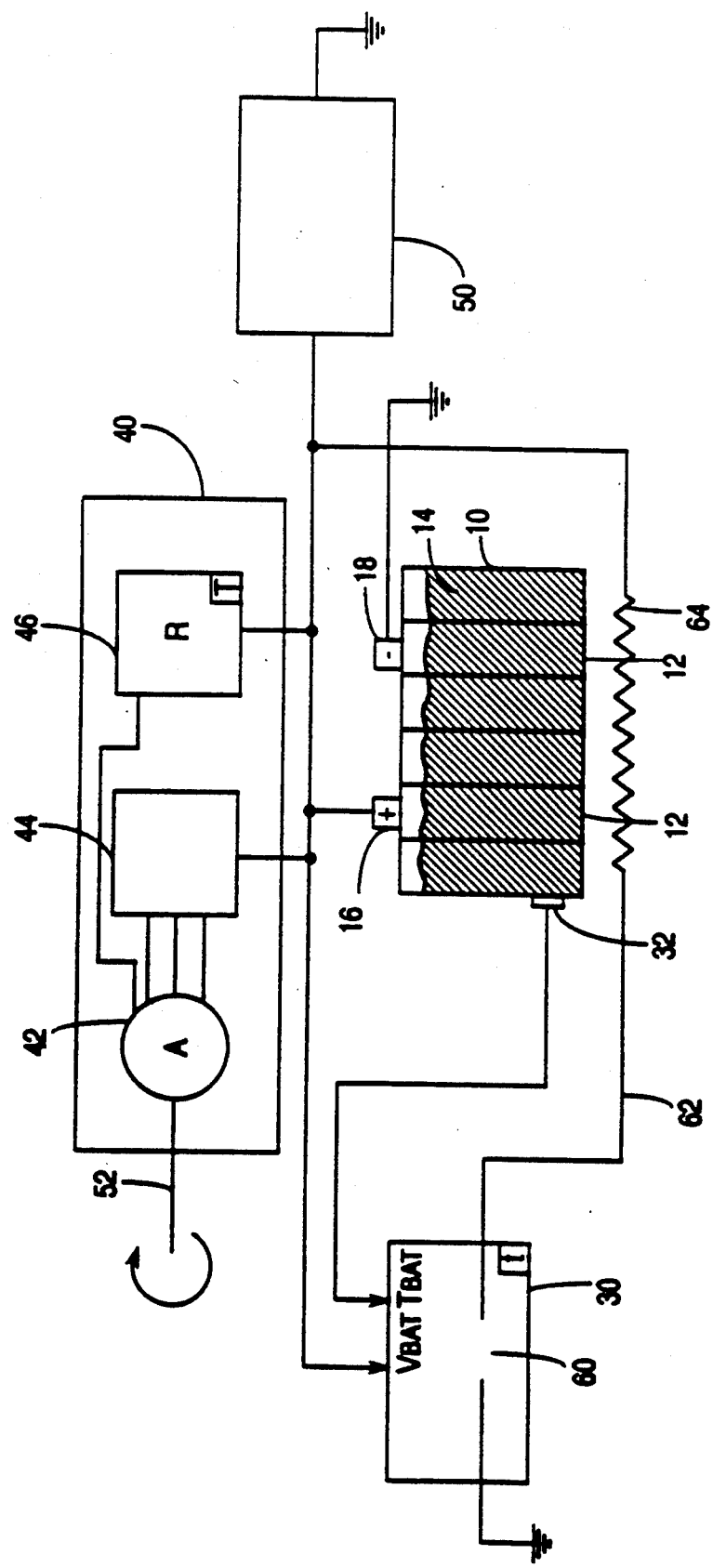
FIG. 1 is a block diagram of a charge management system and a modern vehicle electrical system in accordance with one embodiment of the present invention.

Reference is made to the block diagram of FIG. 1 to describe the basic components of the present invention. The major components of the system are the battery 10, control circuit 30, generation subsystem 40 (herein shown as comprising alternator 42, regulator 44, and rectifier 46), and vehicle electrical load 50. As illustrated, alternator 42 is rotated by input shaft 52 driven by the vehicle engine (not shown). Typically, when the vehicle is in operation, subsystem 40 charges battery 10 and provides electrical energy for various functions within the vehicle as depicted by load 50. In accordance with the present invention, battery 10 is provided with a temperature sensing device 32, which continuously senses the temperature of the battery enclosure which is an indication of the temperature of the electrolyte. The temperature information, as indicated by symbol $T_{BAT}$, is continuously communicated back to control circuit 30.

A typical automobile battery contains a plurality of cells such as shown in the schematic of FIG. 1. Battery 10 is depicted as housing six cells 12, each of which hold a certain amount of electrolyte 14. As is well known, electromotive energy is generated by a chemical reaction in each cell 12 and communicated to terminals 16 and 18 by internally disposed power busses (not shown).

Resistive heating device 64, positioned in an abutting relationship, desirably provides good thermal contact with the bottom of the battery 10. A preferred location of heating device 64 is along the lower region of the cells 12 to provide a thermal gradient in the electrolyte, with higher temperatures in the lower region. The thermal gradient causes thermal convection, which mixes the electrolyte. The electrolyte mixing acts to destratify the cell causing the chemical reaction in the cell to occur more equally throughout the cell. This improves the immediate discharge performance of the battery and lengthens the battery life, while the generally warmer battery will have a greater charge acceptance capability.

A preferred heating device is a resistive element, such as a polyester sheathed battery heater with a silicon interply. A pad having dimensions of 7"×9" and electrical characteristics of 160 watts at 12 volts has been determined to provide adequate heating to a typical automobile battery under the control of a charge management system in accordance with the present invention. Such a pad may be purchased from Johason Electrotherm Corporation, in Terryville, Conn.

The voltage of battery 10 across its terminals 16 and 18, indicated by symbol $V_{BAT}$, is also continuously sensed and is communicated to control circuit 30. As discussed earlier, if the vehicle electrical system is at a balance voltage that is less than the set point voltage, the capacity of the alternator/regulator has been exceeded. Conversely, if the voltage of the electrical system is the set point, it is likely that excess electrical capacity exists. Thus, by monitoring the voltage, the likelihood of excess electrical capacity is also monitored.

Electrical energy is diverted across solid state switch 60, when closed, and provided by line 62 to a heating device 64 which may be, for example, a resistive element. Temperature sensing device 32 is positioned so as to sense temperature $T_{BAT}$, preferably along the lower region of one of the central cells 12, in the vicinity of the heating device. Locating the sensor near the heater allows it to sense a temperature that is indicative of the heater/battery interface as well as the general battery temperature. This will allow the control circuit 30 to prevent localized as well as general overheating.

Figure 2:
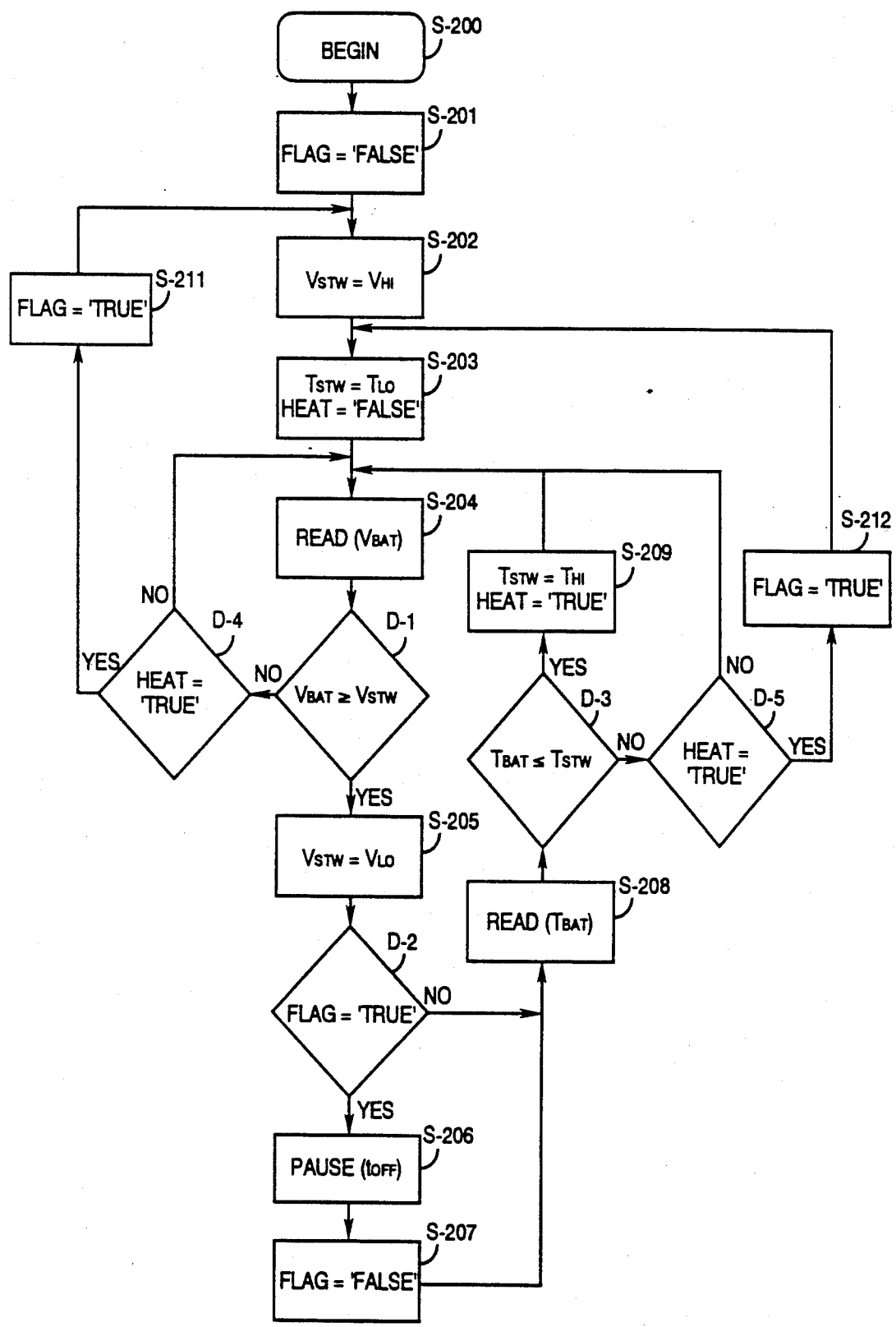
FIG. 2 is a flowchart diagram setting forth the various decision points and functions in accordance with the present invention.

Referring to FIG. 2 a flow chart setting forth the various decision points and functions in accordance with the present invention is shown. A boolean operator, HEAT, is TRUE when the heater is on, and FALSE when the heater is off. Thus, HEAT is set to FALSE when the battery voltage is less than a switching voltage, or when the temperature of the battery is greater than a switching temperature. When the battery voltage is above the switching voltage and the temperature of the electrolyte is less than the switching temperature, HEAT is set to TRUE and the heater element will be turned on.

A pause, provided to prevent overheating of electrical components due to high frequency switching of the solid state switch 60, is observed when FLAG, a boolean operator, is TRUE. FLAG is set to TRUE when the heater is turned off, and set to FALSE when the pause is observed.

Positive feedback is provided in the switching circuitry to sharply define the switching voltage and temperature. The mechanism used to provide the positive feedback may be, for example, a bistable offset. A bistable offset also provides hysteresis in the switching voltage and switching temperatures, represented by $V_{HI}$, $V_{LO}$, $T_{HI}$ and $T_{LO}$. The hysteresis is desirable for several reasons which will be discussed later.

The flow diagram, beginning at step S-200, provides for setting the FLAG to FALSE at step S-201. Step S-201 provides that for the initial or first time through the flowchart the pause will not be observed. The pause is not necessary initially, since all components were off before step S-200.

At step S-202 $V_{STW}$, the switching voltage, is set equal to $V_{HI}$, and at step S-203 $T_{STW}$, the switching temperature is set equal to $T_{LO}$ and HEAT is set equal to FALSE. $V_{HI}$ is the upper battery voltage above which the excess electrical capacity necessary to drive the heater probably exists. $T_{LO}$ is the temperature below which heating will be beneficial.

The battery voltage, $V_{BAT}$, is read at step S-204, and compared to $V_{STW}$ at decision point D-1. If $V_{BAT}$ is less than $V_{STW}$, it is unlikely that the excess electrical capacity which exists is sufficient to drive the heating element; therefore, if the heater is on it will be later turned off. The state of HEAT is then checked at decision point D-4, and if HEAT is TRUE, FLAG is set to TRUE at step S-211. After setting FLAG to TRUE, the flowchart returns to steps S-202 and 203, where the switching points are reset and HEAT is set to FALSE. If HEAT was not TRUE at decision point D-4 the flowchart returns to step S-204 to read the battery voltage.

If $V_{BAT}$ is greater than or equal to $V_{STW}$ at decision point D-1, it is likely that the excess electrical capacity which exists is sufficient to drive the heating element, and the flowchart provides for testing the temperature of the battery to determine if heating would be beneficial. $V_{STW}$ is reset to $V_{LO}$ at step S-205, thereby providing hysteresis in the switching voltage. The hysteresis in the switching voltage is desirable because it compensates for wiring/interconnection voltage drop loss caused when the heating element is turned on.

The state of the FLAG is checked at decision point D-2, to determine if the minimum heater off pause must be performed. If the FLAG is TRUE at decision point D-2, indicating the heater was on, now is off, and $V_{BAT}$ is greater than or equal to $V_{STW}$ (excess electrical capacity likely exists), a pause of $t_{OFF}$ is observed at step S-206, and the FLAG is set to FALSE at step S-207.

The pause is observed to prevent overheating of sensitive electrical components such as, for example, field effect transistors (FETs) used to turn heating device 64 on. In certain situations the battery voltage oscillates above and below the switching voltages, causing the FETs to turn on and off, creating undesirable heat.

The function of FLAG may be established through the use of a capacitor. When FLAG is TRUE, the capacitor is charged. If the capacitor is not discharged, i.e. FLAG is not reset to FALSE, the capacitor will eventually discharge through leakage current, thus effectively resetting FLAG to FALSE. However, the leakage discharge will occur over a time an order of magnitude greater than the pause of the minimum heater off period at step S-206, insuring that the FETs are not overheated.

Following the setting of FLAG to FALSE the temperature of the battery, $T_{BAT}$, is read at step S-208. If FLAG is FALSE at decision point D-2, no pause will be observed before reading the temperature of the battery at step S-208.

$T_{BAT}$ is then compared to the switching temperature, $T_{STW}$, at decision point D-3. If the battery temperature is less than the switching temperature, then the battery electrolyte needs heating and the heater is turned on at step S-209. Also, $T_{STW}$ is set equal to $T_{HI}$, the local sensor temperature at which heating is no longer desired, at step S-209, thereby providing heat until the local sensor temperature is equal to $T_{HI}$. The battery voltage is then read at step S-204.

If the battery temperature is not less than or equal to $T_{STW}$ at decision point D-3, no heating is required and the state of HEAT is checked at decision point D-5. If HEAT is TRUE, FLAG is set to TRUE at step S-212. After setting FLAG to TRUE the flowchart returns to step S-203 to reset $T_{STW}$ and turn the heater off. If HEAT was not TRUE at decision point D-5, there is no need to set FLAG equal to TRUE, and the flowchart returns to step S-204 to read the battery voltage.

The battery will be heated when the local sensor temperature is less than or equal to $T_{LO}$ (assuming the battery voltage is high enough) and will be heated until the temperature reaches $T_{HI}$. When the temperature reaches $T_{HI}$, the heater is switched off to prevent localized overheating, and remains off until the temperature at the sensor decreases to $T_{LO}$. During this time, temperature gradients created by the heater are reduced through thermal convection; therefore, the sensor temperature will more accurately reflect the electrolyte temperature. Thus, the temperature hysteresis prevents localized overheating from occurring while insuring that the battery electrolyte will be heated.

The system operates in one of three modes: full on; full off; and partially on. When there is more than enough excess electrical capacity to operate the heater the system will operate in the full on mode. In the full on mode $V_{BAT}$ is greater than $V_{STW}$, corresponding to a yes at point D-1 for each loop through the flowchart, and the heater will remain on as long as the battery requires heating.

When there is no excess electrical capacity available to operate the heater the system will operate in the full off mode. In the full off mode, corresponding to a no at decision point D-1 each loop through the flowchart, $V_{BAT}$ is less $V_{STW}$, and the heater will remain off.

When there is enough excess electrical capacity to operate the heater part of the time, but not enough to operate the heater constantly, the system operates in the partially on mode. In the partially on mode, corresponding to a yes at decision point D-1 in some loops through the flowchart and a no in some loops, the heater will be on for loops having a yes at decision point D-1 (assuming the battery requires heating). The percentage of loops through the flowchart having a yes at decision D-1 increases as excess electrical capacity increases, and decreases as excess electrical capacity decreases. Thus, as excess electrical capacity increases the percentage of the time the heater is on increases, and as excess electrical capacity decreases, the percentage of the time the heater is on decreases.

Figure 3:
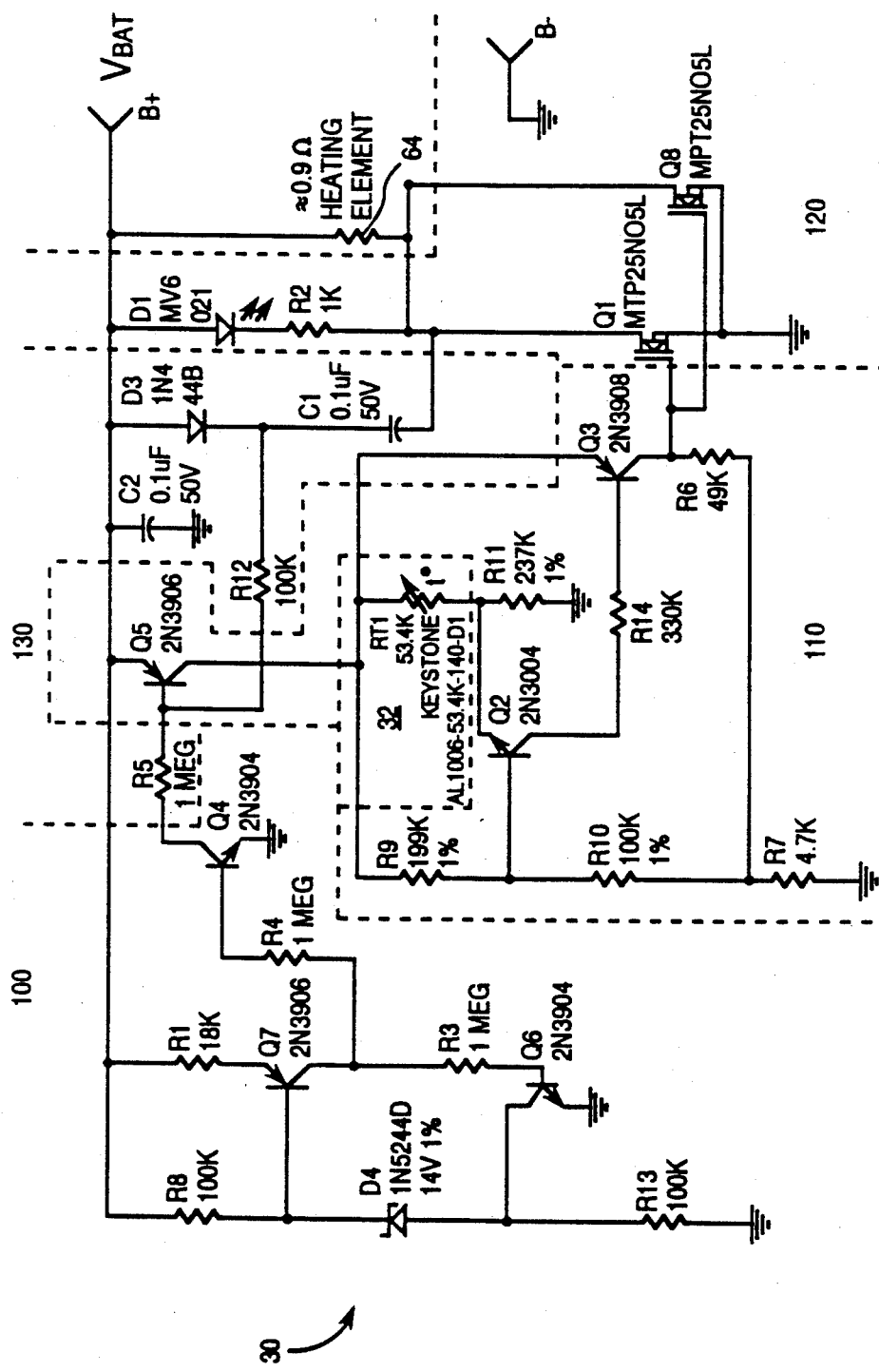
FIG. 3 is a circuit diagram illustrating a preferred circuit for use in the charge management system.

FIG. 3 sets forth the details of a circuit designed to implement the charge management system in accordance with the present invention. The circuit includes control circuit 30, temperature sensing device 32 and resistive heating device 64, and is divided into four sections set up by the dashed lines with each section discussed in detail below. Generally, however, the sections are (a) voltage sensing section 100 which functions to determine whether battery voltage, $V_{BAT}$, is greater than the defined switching voltage, $V_{STW}$; (b) temperature sensing section 110 which functions to determine if the temperature of the battery, $T_{BAT}$, is below a defined switching temperature $T_{STW}$; (c) drive section 120 which insures current passes through a resistive heating element in proximity to a battery; and (d) a restrike control or signal delay section 130 which insures that the drive section does not begin to conduct current through the heating element until the expiration of a predetermined minimum time period, $t_{OFF}$, since the last time section 120 was conducting. Capacitor C2 is provided between the battery and ground to filter the power supply.

Voltage Sensing Section

The desired switching voltage, $V_{STW}$, is established by the zener voltage of zener diode D4 summed with the saturated emitter-base (eb) voltage of transistor Q7, minus a bi-stable offset voltage which is a function of transistor Q6 and resistors R8 and R13. The bi-stable offset voltage introduces hysteresis to $V_{STW}$, the amount of which is controlled by the ratio of resistor R8 to resistor R13 and the saturated collector-emitter (ce) voltage of transistor Q6. As transistor Q7 conducts, transistor Q6 will conduct, increasing the voltage across resistor R8 and forcing transistor Q7 to conduct more. This continues until transistor Q7 and transistor Q6 are saturated, with the currents being limited by R1 and R8, and causes the bi-stability. When $V_{BAT}$ is greater than $V_{STW}$, Q4 will be conducting.

A positive switching action occurs as $V_{BAT}$ becomes greater than $V_{STW}$. When $V_{BAT}$ is less than $V_{STW}$, the voltage across resistor R8 will not forward bias transistor Q7 enough to cause it to conduct and prevents transistor Q4 from conducting. As $V_{BAT}$ increases thru $V_{STW}$, the voltage across resistor R8 increases, which sufficiently forward biases transistor Q7 to cause it to conduct. This in turn will forward bias transistor Q6 and transistor Q4, thru balancing resistors R3 and R4, causing Q4 and Q6 to conduct. As the current into the base of transistor Q6 increases, it acts to short circuit resistor R13, increasing the voltage across resistor R8 and thus provides a positive switching action on transistors Q7, Q6 and Q4. Thus, transistor Q4 is now conducting.

As $V_{BAT}$ decreases thru $V_{STW}$, the voltage across resistor R8 and the $V_{eb}$ of transistor Q7 will fall, causing transistors Q7, Q6 and Q4 to stop conducting with the same positive switching action.

The Temperature Sensing Section

Section 100 is only operable when transistor Q4 of the voltage section is conducting and transistor Q5 is forward biased.

Switching temperature, $T_{STW}$, is established by the values of resistors R9, R10, R7 and their relationship to resistor R11 and the negative temperature coefficient thermistor RT1 (temperature sensing device 32). $T_{STW}$ is the temperature of thermistor RT1 where the voltage across resistor R9 is equal to that across thermistor RT1 minus a fixed sense voltage, $V_{sen}$. Sense voltage, $V_{sen}$, is a function of transistors Q2, Q3 and resistors R14, R11 and is the voltage necessary for transistor Q2 to conduct enough from the base of transistor Q3 thru resistor R14 such that transistor Q3 will begin to conduct. Hysteresis in the switching temperature, $T_{STW}$, is introduced by transistor Q3, the amount of which is controlled by the ratio of R9 and R10 to resistor R6 and the saturated emitter-collection voltage of transistor Q3. As transistor Q2 conducts, transistor Q3 will conduct, decreasing the voltage across resistor R9 and forcing transistor Q2 to conduct more. This will continue until transistor Q3 is saturated with its current being limited by resistors R6 and R7. When $T_{BAT}$ is less than $T_{STW}$ and transistor Q5 is forward biased, transistor Q3 will be conducting.

When $T_{BAT}$ is greater than $T_{STW}$, the voltage across resistor R9 is greater than the voltage across thermistor RT1 and the base-emitter junction of transistor Q2 will be reverse biased. This will prevent transistor Q3 from conducting.

As $T_{BAT}$ decreases thru $T_{STW}$, the voltage across thermistor RT1 will increase causing transistor Q2 to become forward biased with fixed sense voltage, $V_{sen}$. As the current thru resistor R7 increases, it acts to decrease the voltage across resistor R9. This provides a positive switching action on transistors Q2 and Q3. Thus, transistor Q3 is now conducting.

As $T_{BAT}$ increases thru $T_{STW}$, the voltage across thermistor RT1 will decrease and the base emitter voltage of transistor Q2 will fall, causing transistors Q2 and Q3 to stop conducting with the same positive switching action.

Drive Section

Whenever transistor Q3 is conducting, a positive voltage is presented to the gates of field-effect transistors (FETs) Q1 and Q8 with respect to their sources. This causes them to conduct current thru the heating element and foward biases light emitting diode D1. Resistor R2 limits the current through diode D1.

Signal Delay Section

The desired minimum delay period, $t_{OFF}$, is established by resistors R5, R12, and capacitor C1. The delay period is the time it takes capacitor C1 to discharge to a voltage that allows transistor Q5 to be forward biased when transistor Q4 is conducting. Whenever transistors Q1 and Q8 are conducting, capacitor C1 will quickly charge thru diode D3 to $V_{BAT}$ minus the voltage drop of diode D3 and FETs Q1 and Q8. If for any reason, transistors Q1 and Q8 should stop conducting, the low side of capacitor C1 will find itself at a voltage of $V_{BAT}$ thru the heating element (resistive heating element 64). Since the voltage across a capacitor cannot be changed instantaneously, the high side of capacitor C1 will be near a voltage of twice $V_{BAT}$ and diode D3 will be reverse biased. This will also reverse bias transistor Q5 and prevent it from conducting.

If a failure of $V_{BAT}$ to stay above $V_{STW}$ is the reason that transistors Q1 and Q8 stopped conducting, transistor Q4 is not conducting. When transistor Q4 again begins to conduct, it must discharge capacitor C1 through resistors R5 and R12 until transistor Q5 is forward biased. Assuming that $T_{BAT}$ is still less than $T_{STW}$, transistors Q1 and Q8 will be switched on and the low side of capacitor C1 will drop to ground plus the drop across transistors Q1 and Q8. This will reinforce the forward bias on transistor Q5 and provide a positive switching action.

If a failure of $T_{BAT}$ to stay below $T_{STW}$ is the reason that transistors Q1 and Q8 stopped conducting, transistor Q4 is still conducting and the discharge of capacitor begins immediately.

An alternative embodiment of the present invention is the use of the management system with an external power source. If an external 12-16 volt DC power supply (or a rectified AC supply) is used to charge the battery, the present invention provides for heating the battery while the battery is being charged. This improves charge acceptance and immediate discharge performance, i.e., discharges while the battery is still warm. One such use is with home battery chargers, wherein house current is transformed to provide a 12-16 volt DC output. When the charger is connected to the battery terminals, the heater would also be powered if the battery voltage and temperature characteristics are being met.

It should be clear from the foregoing that modifications and changes may be made to the invention without departing from the scope of the claims.

We claim:

1. A control apparatus for heating one or more cells of a battery comprising:
   (a) a heater positioned near the battery;
   (b) control means, including switching means for electrically and selectively connecting said heater to an energy source, for continuously comparing at discrete intervals of time the instant battery temperature to a switching temperature and comparing instant voltage of said battery to a switching voltage; and
   (c) said switching means being arranged for connecting said heater to said energy source in response to said instant voltage exceeding said switching voltage and said instant battery temperature being less than said switching temperature, and for not connecting said heater to said energy source in response to said instant voltage being less than said switching voltage or said instant battery temperature being greater than said switching temperature.

2. The apparatus of claim 1 in which said control means compares said instant voltage and said switching voltage before comparing said instant battery temperature and said switching temperature.

3. The control apparatus of claim 2 in which said control means delays subsequently comparing said instant temperature to said switching temperature when said instant battery voltage is less than said switching voltage for a predetermined time interval greater than one of said discrete intervals of time.

4. The apparatus of claim 1 in which said control means compares said instant voltage and said switching voltage subsequent to comparing said instant battery temperature and said switching temperature.

5. The apparatus of claim 1 wherein:
   (a) said switching means further includes a first switching element and a second switching element connected in series;
   (b) said first switching element being closed in the event that said instant voltage is greater than said switching voltage;
   (c) said first switching element being open in the event that said instant voltage is less than said switching voltage;
   (d) said second switching element being closed in the event that said instant battery temperature is less than said switching temperature; and
   (e) said first switching element being open in the event that said instant battery temperature is greater than said switching temperature.

6. The apparatus of claim 5 in which said first switching element includes means for providing positive feedback to said first switching element, whereby said first switching element changes status more quickly.

7. The apparatus of claim 5 in which said second switching element includes means for providing positive feedback to said second switching element, whereby said second switching element changes status more quickly.

8. The apparatus of claim 5 in which said switching voltage is a first predetermined voltage in the event that said first switching element is open and a second predetermined voltage in the event that said first switching element is closed.

9. The apparatus of claim 5 in which said switching temperature is a first predetermined temperature in the even that said second switching element is open and a second predetermined temperature in the event that said second switching element is closed.

10. The apparatus of claim 1 in which said instant temperature is the instant battery temperature in the vicinity of said heater.

11. The apparatus of claim 1 in which said heater is further positioned adjacent a lower region of said battery, wherein said battery is of the type having an electrolyte, and further wherein the heating of said cells provides thermal convection in the electrolyte.

12. A charge management system, in combination with a vehicle electrical system that includes a power generation system and a battery, comprising:
   (a) heating means for the controlled heating of said battery; and
   (b) control means, including a switching means for electrically selectively connecting said heating means to said power generation system, for determining the instant battery temperature and instant excess electrical capacity of said power generation system, said switching means connecting said heating means to said power generation system in the even that the instant battery temperature is less than a switching temperature and said instant excess electrical capacity exists.

13. The charge management system of claim 12 in which said power generation system is a vehicle power generation subsystem.

14. The charge management system of claim 13 in which said control means includes a temperature sensing means for comparing said instant battery temperature to said switching temperature and a voltage sensing means for comparing said instant battery voltage to a switching voltage, wherein one of said temperature sensing means and said voltage sensing means, in response to a first signal generated by the other of said temperature and voltage sensing means, generates a second signal, said switching means being responsive to said second signal for connecting said subsystem to said heating means.

15. The charge management system of claim 14 in which said one sensing means is said temperature sensing means.

16. The charge management system of claim 14 in which said one sensing means is said voltage sensing means.

17. The apparatus of claim 14 in which said switching voltage is equal to the vehicle power generation subsystem instant set point voltage.

18. The apparatus of claim 13 wherein:
(a) said switching means further includes a first said switching element and a second switching element connected in series;
(b) said first switching element being closed in the event that said instant battery electrical capacity exists;
(c) first instant battery element being open in the event that said instant excess electrical capacity does not exist;
(d) said second switching element being closed in the event that said instant temperature is less than said switching temperature; and
(e) said first switching element being open in the event that said switching temperature is greater than said switching temperature.

19. The apparatus of claim 18 in which said first switching element includes means for providing positive feedback to said first switching element, whereby said first switching element changes status more quickly.

20. The apparatus of claim 18 in which said second switching element includes means for providing positive feedback to said second switching element, whereby said second switching element changes status more quickly.

21. The apparatus of claim 18 in which said switching voltage is a first predetermined voltage in the event that said first switching element is open and a second predetermined voltage in the event that said first switching element is closed.

22. The apparatus of claim 18 in which said switching temperature is a first predetermined temperature in the event that said second switching element is open and a second predetermined temperature in the event that said second switching element is closed.

23. The apparatus of claim 13 in which said heating means is positioned adjacent said battery.

24. The apparatus of claim 13 in which said instant temperature is the instant battery temperature in the vicinity of said heating means.

25. The apparatus of claim 13 wherein said heating means is positioned adjacent the lower region of said battery, and further wherein the controlled heating of said cells provides thermal convection in the electrolyte.

26. The charge management system of claim 13 in which said switching means disconnects said heating means and said subsystem when said instant temperature is greater than said predetermined temperature.

27. A system for use in a vehicle for the controlled heating of a battery of the type having an electrolyte, said system comprising:
(a) an alternator for generating an electric current;
(b) heating means, electrically connected to said alternator, for heating said battery, said heating means for heating said battery when receiving said current from said alternator;
(c) switching means positioned for connecting said heating means to alternator;
(d) control means, including a first means for sensing the temperature of the electrolyte within said battery and a second means for sensing the voltage across the terminals of said battery, for selectively opening and closing said switching means, said control means being arranged for causing said switching means to close in response to:
(i) said first means sensing that said temperature of the electrolyte within said battery is below a switching temperature level; and
(ii) said second means sensing instant excess electrical capacity of said alternator;
thereby allowing said electric current to flow from said alternator to said heating means.

28. The apparatus of claim 27 wherein:
(a) said switching means further includes a first switching element and a second switching element connected in series;
(b) said first switching element being closed in the event that said instant excess electrical capacity of said alternator exists;
(c) said first switching element being open in the event that said instant excess electrical capacity does not exist;
(d) said second switching element being closed in the event that said sensed temperature is less than said switching temperature; and
(e) said first switching element being open in the event that said sensed temperature is greater than said switching temperature.

29. The apparatus of claim 28 wherein said first switching element includes means for providing positive feedback to said first switching element, whereby said first switching element changes status more quickly.

30. The apparatus of claim 28 wherein said second switching element includes means for providing positive feedback to said second switching element, whereby said second switching element changes status more quickly.

31. The apparatus of claim 28 in which said sensed temperature is the sensed temperature in the vicinity of said heating means.

32. The apparatus of claim 28 in which said switching voltage is a first predetermined voltage in the event that said first switching element is open and a second predetermined voltage in the event that said first switching element is closed.

33. The apparatus of claim 28 wherein said switching temperature is a first predetermined temperature in the event that said second switching element is open and a second predetermined temperature in the event that said second switching element is closed.

34. The apparatus of claim 27 wherein said heating means is positioned adjacent said battery.

35. The apparatus of claim 27 wherein said heating means is positioned adjacent the lower region of said battery, and further wherein the controlled heating of said cell provides for convection currents in the electrolyte.

36. The apparatus of claim 27 wherein said alternator is part of a vehicle power generation subsystem, and further wherein said switching voltage is equal to the power generation subsystem set point.

37. A method for heating one or more cells of a battery of the type having an electrolyte using the instant excess electrical capacity of a power generating subsystem of a vehicle electrical system comprising the steps of:

(a) positioning a heating element connected by an electrical circuit to said power generating subsystem adjacent said battery;

(b) comparing the instant battery temperature of electrolyte in one or more of said cells to a predetermined switching temperature;

(c) determining said instant excess electrical capacity of said power generating subsystem;

(d) closing said circuit in the event that said instant excess electrical capacity exists and said instant battery temperature is less than said switching temperature, thereby activating said heating element;

(e) opening said circuit in the event that said instant excess electrical capacity does not exist, thereby deactivating said heating element; and (f) opening said circuit in the event that said instant battery temperature is greater than said switching temperature, thereby deactivating said heating element.

38. The method of claim 37 wherein step (b) is performed before step (c).

39. The method of claim 38 wherein the performance of step (c) is delayed for a predetermined time interval after the completion of step (b).

40. The method of claim 39 wherein step (d) is performed after steps (b) and (c), and wherein the performance of step (d) is delayed for a predetermined time interval after the completion of steps (b) and (c).

41. The method of claim 39 wherein step (c) includes the step of comparing the instant voltage of said battery to a predetermined switching voltage.

* * * * *

UNITED STATES PATENT AND TRADEMARK OFFICE
CERTIFICATE OF CORRECTION

PATENT NO. : 5,055,656

DATED : October 8, 1991

INVENTOR(S) : Andrew J. Farah and William J. Wruck

It is certified that error appears in the above-identified patent and that said Letters Patent is hereby corrected as shown below:

Column 10, lines 8 and 9, "instant temperature" should read --instant battery temperature--.
Column 10, line 10, "instant battery voltage" should read --instant voltage--.
Column 11, line 4, "even that" should read --event that--.

Signed and Sealed this

Twenty-third Day of February, 1993

Attest:

STEPHEN G. KUNIN

*Attesting Officer*     *Acting Commissioner of Patents and Trademarks*